(12) United States Patent
Yawata et al.

(10) Patent No.: US 12,249,876 B2
(45) Date of Patent: Mar. 11, 2025

(54) MOTOR

(71) Applicant: Nidec Corporation, Kyoto (JP)

(72) Inventors: Atsushi Yawata, Kyoto (JP); Yasuhiro Utsunomiya, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 293 days.

(21) Appl. No.: 17/941,311

(22) Filed: Sep. 9, 2022

(65) Prior Publication Data

US 2023/0077681 A1  Mar. 16, 2023

(30) Foreign Application Priority Data

Sep. 10, 2021  (JP) .................................. 2021-147779

(51) Int. Cl.
- *H02K 11/21* (2016.01)
- *H02K 1/18* (2006.01)
- *H02K 11/215* (2016.01)
- *H02K 21/22* (2006.01)

(52) U.S. Cl.
CPC ........... *H02K 11/215* (2016.01); *H02K 1/187* (2013.01); *H02K 21/22* (2013.01)

(58) Field of Classification Search
CPC ....... H02K 21/22; H02K 11/215; H02K 1/187; H02K 11/21; H02K 1/12
See application file for complete search history.

(56) References Cited

U.S. PATENT DOCUMENTS 5,254,895 A * 10/1993 Koizumi .................. H02K 1/18
310/66
10,340,773 B2 * 7/2019 Nishidate ............. H02K 11/215

FOREIGN PATENT DOCUMENTS

JP          2004-015911 A       1/2004

* cited by examiner

*Primary Examiner* — Leda T Pham
(74) *Attorney, Agent, or Firm* — Keating & Bennett, LLP

(57) ABSTRACT

A motor includes a stator, a rotor, and a magnetic sensor. The stator includes an annular stator core. The stator core surrounds a central axis extending in an axial direction. The rotor is rotatable about the central axis. The rotor includes a first magnet, a second magnet, and a spacer. The first magnet is outward in a radial direction with respect to the stator core. The second magnet extends in one axial direction with respect to the first magnet and the stator core. The spacer is between the first magnet and the second magnet in the axial direction. The magnetic sensor detects a magnetic force of the second magnet. The spacer is made of a non-magnetic material.

16 Claims, 4 Drawing Sheets

MOTOR

CROSS REFERENCE TO RELATED APPLICATIONS

The present application claims priority under 35 U.S.C. § 119 to Japanese Patent Application No. 2021-147779, filed on Sep. 10, 2021, the entire contents of which are hereby incorporated herein by reference.

1. FIELD OF THE DISCLOSURE

The present disclosure relates to a motor.

2. BACKGROUND

A conventional motor that detects a rotational position of a rotor by a sensor magnet and a magnetic sensor has been known. For example, a cylindrical sensor magnet is integrated with a rotor magnet so that a shield plate made of a ferromagnetic material is sandwiched therebetween, and is fixed to a motor shaft together with the rotor magnet. A magnetic pole of the sensor magnet is detected by a magnetic detection component arranged to face the sensor magnet.

In recent years, a demand for weight reduction of the motor has been increasing. However, in the configuration in which the ferromagnetic material such as iron is used as the material of the shield plate as in the motor described above, weight of the motor tends to increase.

SUMMARY

A motor according to an example embodiment of the present disclosure includes a stator, a rotor, and a magnetic sensor. The stator includes an annular stator core. The stator core surrounds a central axis extending in an axial direction. The rotor is rotatable about the central axis. The rotor includes a first magnet, a second magnet, and a spacer. The first magnet is outward in a radial direction with respect to the stator core. The second magnet extends in one axial direction with respect to the first magnet and the stator core. The spacer is between the first magnet and the second magnet in the axial direction. The magnetic sensor detects a magnetic force of the second magnet. The spacer is made of a non-magnetic material.

A motor according to another example embodiment of the present disclosure includes a stator, a rotor, and a magnetic sensor. The stator includes an annular stator core. The stator core surrounds a central axis extending in an axial direction. The rotor is rotatable about the central axis. The rotor includes a first magnet, a yoke, and a second magnet. The first magnet is outward in a radial direction with respect to the stator core. The yoke is on an end portion opposite to the stator core in the radial direction of the first magnet. The second magnet extends in one axial direction with respect to the first magnet and the stator core. The magnetic sensor detects a magnetic force of the second magnet. The second magnet is spaced by a gap from the first magnet in the axial direction. One axial direction end portion of the yoke extends in the one axial direction with respect to one axial direction end portion of the first magnet and is in contact with another axial direction end surface of the second magnet.

The above and other elements, features, steps, characteristics and advantages of the present disclosure will become more apparent from the following detailed description of the example embodiments with reference to the attached drawings.

DETAILED DESCRIPTION

Example embodiments will be described with reference to the drawings hereinafter.

It is to be noted that, in the present specification, a direction parallel to a central axis CA is referred to as an "axial direction". In the axial directions, a direction from a first magnet 16 to a second magnet 17 described later is referred to as "one axial direction D1", and a direction from the second magnet 17 to the first magnet 16 is referred to as "the other axial direction D2". A direction orthogonal to the central axis CA is referred to as a "radial direction", and a rotational direction about the central axis CA is referred to as a "circumferential direction Dr". In the radial directions, a direction approaching the central axis CA is referred to as "radially inward", and a direction away from the central axis CA is referred to as "radially outward".

In the present specification, an "annular shape" includes not only a shape continuously connected without a cut over the entire region in the circumferential direction around a predetermined axis such as the central axis CA but also a shape having one or more cuts in a part of the entire region around the predetermined axis. In addition, a shape that draws a closed curve around a predetermined axis in a curved surface intersecting with the predetermined axis is also included.

In addition, in a positional relationship between any one of an azimuth, a line, and a plane and another, "parallel" includes not only a state in which both of them do not intersect at all no matter how long they extend, but also a state in which they are substantially parallel. In addition, "perpendicular" and "orthogonal" include not only a state in which both of them intersect each other at 90 degrees, but also a state in which they are substantially perpendicular and a state in which they are substantially orthogonal. In other words, each of "parallel", "perpendicular", and "orthogonal" includes a state in which the positional relationship between the two of them permits an angular deviation to a degree not departing from the spirit of the present disclosure.

It is to be noted that the above names are names used merely for description, and are not intended to limit actual positional relationships, directions, names, and the like.

Figure 1:
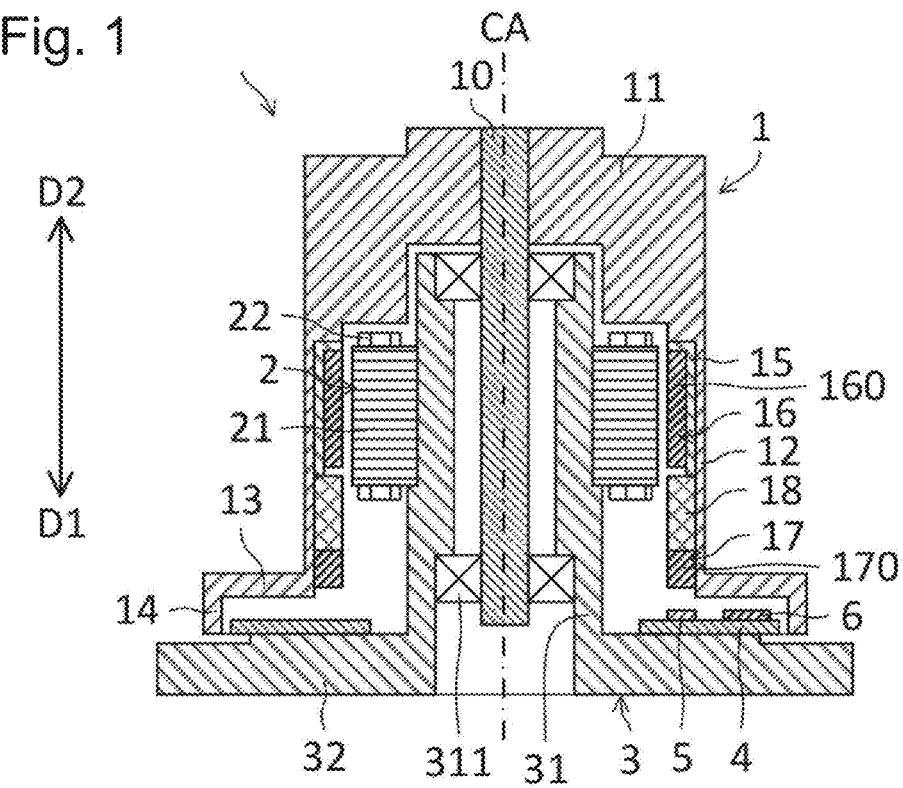
FIG. 1 is a sectional view illustrating a configuration example of a motor according to a first example embodiment of the present disclosure.
Figure 2:
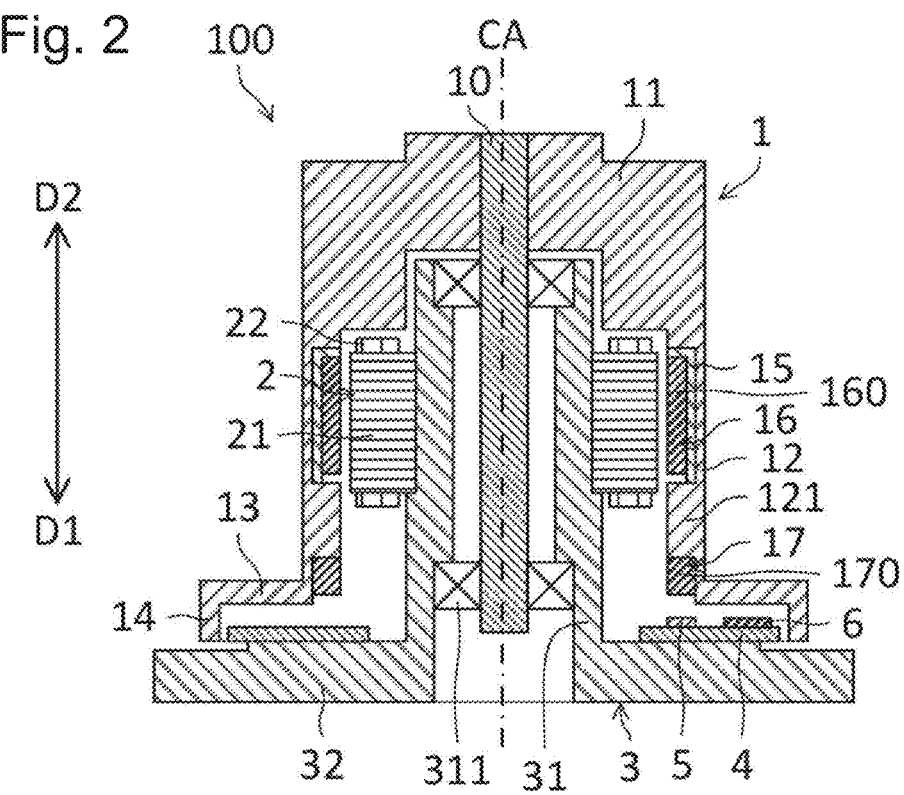
FIG. 2 is a sectional view illustrating a configuration example of the motor according to a first modification of an example embodiment of the present disclosure.
Figure 3:
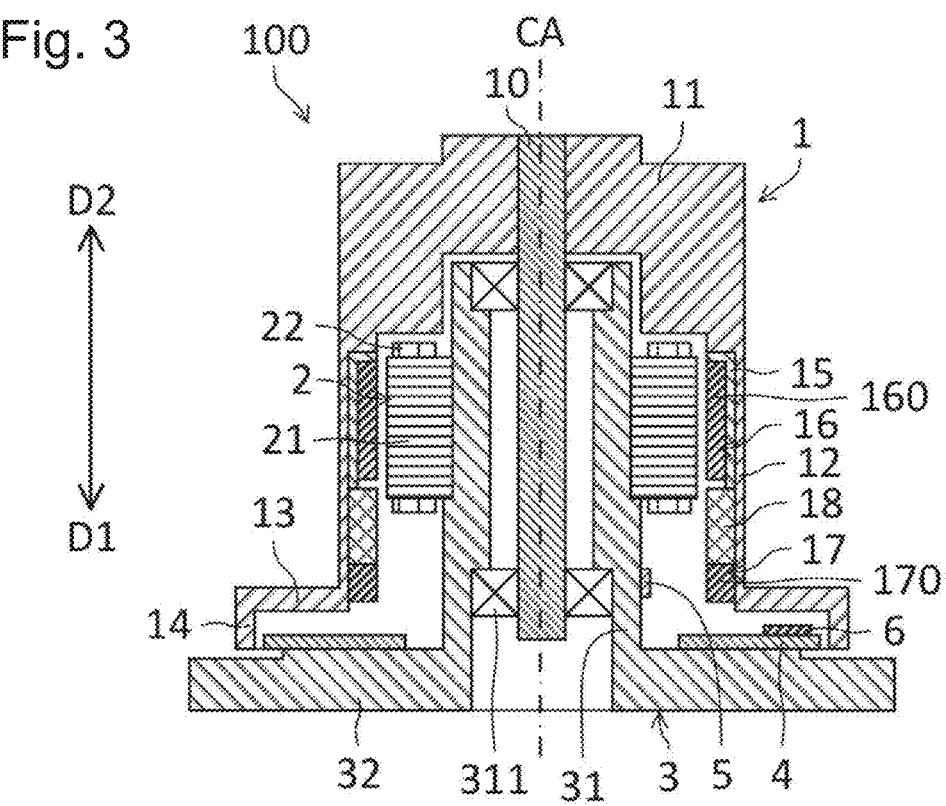
FIG. 3 is a sectional view illustrating a configuration example of the motor according to a second modification of an example embodiment of the present disclosure.

FIG. 1 is a sectional view illustrating a configuration example of a motor 100 according to the present example embodiment. Each of FIGS. 2 and 3 illustrates another configuration example of the motor 100. FIG. 2 is a sectional view illustrating the configuration example of the motor 100 according to a first modification. FIG. 3 is a sectional view illustrating the configuration example of the motor 100 according to a second modification.

The motor 100 includes a rotor 1, a stator 2, a stator holder 3, a substrate 4, a magnetic sensor 5, and an encoder 6.

The rotor 1 is rotatable about the central axis CA extending in the axial direction. As described above, the motor 100 includes the rotor 1. The rotor 1 has a shaft 10, a rotor hub 11, a rotor tube portion 12, a flange portion 13, a circumferential wall portion 14, a yoke 15, the first magnet 16, the second magnet 17, and a spacer 18.

The shaft 10 has a columnar shape extending in the axial direction along the central axis CA.

The rotor hub 11 is fixed to an end portion on the other axial direction D2 side of the shaft 10. The rotor hub 11 has a disk shape surrounding the shaft 10, and expands radially outward from a radially outer end portion of the shaft 10.

The rotor tube portion 12 extends in the axial direction and surrounds the central axis CA. As described above, the rotor 1 includes the rotor tube portion 12. In detail, the rotor tube portion 12 has a tubular shape surrounding the stator 2 and extends in the one axial direction D1 from a radially outer end portion of the rotor hub 11.

The flange portion 13 expands radially outward from an end portion on the one axial direction D1 side of the rotor tube portion 12 and extends in the circumferential direction Dr.

The circumferential wall portion 14 extends in the one axial direction D1 from a radially outer end portion of the flange portion 13 and extends in the circumferential direction Dr.

In the present example embodiment, the rotor hub 11, the rotor tube portion 12, the flange portion 13, and the circumferential wall portion 14 are integrated. Materials of the above components are, for example, lightweight metals such as aluminum (Al). It is to be noted that the present disclosure is not limited to the example of the present example embodiment, and at least a portion of the above components may be a member different from the other portion.

The yoke 15 is disposed on a radially inner side surface of the rotor tube portion 12. A magnetic material such as iron is used as a material of the yoke 15. In the present example embodiment, the yoke 15 has a tubular shape extending in the axial direction. In the present example embodiment, a position in the axial direction of an end portion on the one axial direction D1 side of the yoke 15 is the one axial direction D1 with respect to an end portion on the one axial direction D1 side of the first magnet 16. However, the present disclosure is not limited to the above example, and the position in the axial direction of the end portion on the one axial direction D1 side of the yoke 15 may be the same as the position of the end portion on the one axial direction D1 side of the first magnet 16, or may be the other axial direction D2 than the position of the end portion on the one axial direction D1 side of the first magnet 16. It is to be noted that the present disclosure is not limited to the example of the first example embodiment, and the yoke 15 may be omitted.

The first magnet 16 is disposed on a radially inner side surface of the yoke 15 and faces the stator 2 in the radial direction. As described above, the rotor 1 has the first magnet 16. In the present example embodiment, the first magnet 16 of the rotor 1 is disposed radially outward with respect to a stator core 21 of the stator 2 described later. That is, the motor 100 according to the present example embodiment is an outer rotor type. The yoke 15 is disposed on an end portion (for example, a radially outer end portion) opposite to the stator core 21 in the radial direction of the first magnet 16. As described above, the rotor 1 has the yoke 15.

In the first magnet 16, magnetic poles different from each other (that is, the N pole and the S pole) are alternately arranged in the circumferential direction Dr. In the present example embodiment, the first magnet 16 has a plurality of magnet pieces 160 magnetized in the radial direction. The plurality of magnet pieces 160 are arranged in the circumferential direction Dr and surround the central axis CA. However, the present disclosure is not limited to the above example, and the first magnet 16 may be a single member surrounding the central axis CA.

The second magnet 17 is disposed on an end surface (for example, the radially inner side surface) on the stator core 21 side in the radial direction of the rotor tube portion 12. The second magnet 17 is disposed on the one axial direction D1 with respect to the first magnet 16 and the stator core 21. The rotor 1 has the second magnet 17. For example, as illustrated in FIG. 1, the second magnet 17 is disposed with a gap from the first magnet 16 in the axial direction.

In the second magnet 17, magnetic poles different from each other (that is, the N pole and the S pole) are alternately arranged in the circumferential direction Dr. In the present example embodiment, the second magnet 17 has a plurality of magnet pieces 170 magnetized in the axial direction. The plurality of magnet pieces 170 are arranged in the circumferential direction Dr and surround the central axis CA. However, the present disclosure is not limited to the above example, and the second magnet 17 may be a single member surrounding the central axis CA.

The spacer 18 is disposed between the first magnet 16 and the second magnet 17 in the axial direction. As described above, the rotor 1 has the spacer 18. The spacer 18 is a non-magnetic material. Although the material of the spacer 18 is resin in the present example embodiment, the material may be, for example, lightweight non-magnetic metal such as Al. Since the spacer 18 between the first magnet 16 and the second magnet 17 is made of the non-magnetic material, weight of the motor 100 is further reduced as compared with a configuration in which the spacer 18 is made of the magnetic material.

In the present example embodiment, the spacer 18 is a member different from the rotor tube portion 12, is disposed on the radially inner side surface of the rotor tube portion 12, and extends in the circumferential direction Dr. However, the present disclosure is not limited to the above example, and the spacer 18 may be integrated with the rotor tube portion 12 as illustrated in FIG. 2. For example, a protruding portion 121 protruding toward the stator core 21 side in the radial direction is disposed on an end portion on the stator core 21 side in the radial direction of the rotor tube portion 12. The protruding portion 121 is used as the spacer 18. In FIG. 2, the spacer 18 is the protruding portion 121 protruding radially inward on a radially inner side portion of the rotor tube portion 12 and extends in the circumferential direction Dr.

In this way, since the number of components of the motor 100 is decreased, the number of manufacturing processes and a manufacturing cost of the motor 100 is reduced. Consequently, productivity of the motor 100 is improved. In addition, for example, when the second magnet 17 is directly disposed on the end portion (for example, a radially inner end portion) on the stator core 21 side in the radial direction of the rotor tube portion 12, the radial size of the second magnet 17 is further increased as compared with a configuration in which the second magnet 17 is disposed on the rotor tube portion 12 via a member such as the yoke 15. Consequently, a magnetic force of the second magnet 17 is made to be stronger, and detection accuracy of the magnetic sensor 5 is improved. Alternatively, the axial size of the second magnet 17 is further reduced, while the reduction in the magnetic force being suppressed or prevented.

Preferably, an end portion on the stator core 21 side in the radial direction of the spacer 18 is at the same radial position as an end portion on the stator core 21 side in the radial direction of the first magnet 16, or at a position opposite to the stator core 21 in the radial direction with respect to the end portion on the stator core 21 side in the radial direction of the first magnet 16. For example, although the radial position of a radially inner end portion of the spacer 18 is the same as the radial position of a radially inner end portion of the first magnet 16 in the present example embodiment, the radial position of the radially inner end portion of the spacer 18 may be located radially outward with respect to the radially inner end portion of the first magnet 16. In this way, interference of the spacer 18 with the stator 2 is prevented. For example, when the motor 100 is assembled, the stator 2 is prevented from hitting the spacer 18, so that the motor 100 is easily assembled. Consequently, the productivity of the motor 100 is improved due to an improvement of manufacturing efficiency. However, the above example does not exclude a configuration in which the end portion on the stator core 21 side in the radial direction of the spacer 18 is located at a position on the stator core 21 side in the radial direction with respect to the end portion on the stator core 21 side in the radial direction of the first magnet 16. In this case, it is sufficient that the stator 2 does not interfere with the spacer 18. For example, the configuration in which the radial position of the radially inner end portion of the spacer 18 is located radially inward with respect to the radially inner end portion of the first magnet 16 is not excluded.

In the present example embodiment, an end portion on the other axial direction D2 side of the spacer 18 is in contact with the end portion on the one axial direction D1 side of the yoke 15. As a result, when assembling the rotor 1, an axial position of the spacer 18 is easily determined.

Figure 4A:
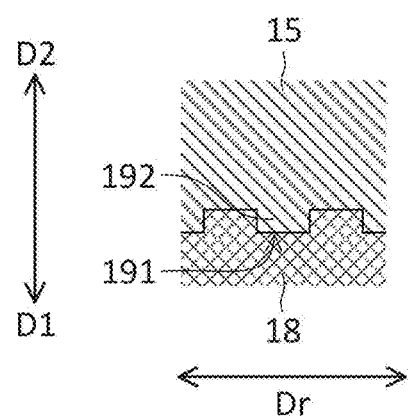
FIG. 4A is a view illustrating a configuration example of an end portion on one axial direction side of a yoke and an end portion on the other axial direction side of a spacer according to an example embodiment of the present disclosure.
Figure 4B:
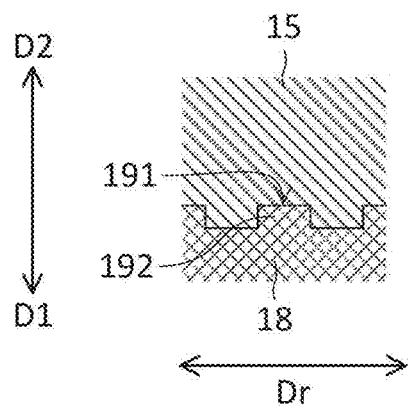
FIG. 4B is a view illustrating another configuration example of the end portion on the one axial direction side of the yoke and the end portion on another axial direction side of the spacer.

FIGS. 4A and 4B are enlarged views of a contact portion between the yoke 15 and the spacer 18 as viewed from the radial direction. FIG. 4A is the view illustrating a configuration example of the end portion on the one axial direction D1 side of the yoke 15 and the end portion on the other axial direction D2 side of the spacer 18. FIG. 4B is the view illustrating another configuration example of the end portion on the one axial direction D1 side of the yoke 15 and the end portion on the other axial direction D2 side of the spacer 18.

In FIGS. 4A and 4B, one member of the yoke 15 and the spacer 18 preferably has a first recess 191. Further, the other member of the yoke 15 and the spacer 18 has a first protrusion 192. In the configurations illustrated in FIGS. 4A and 4B, the one member described above is referred to as a "first assembly", and the other member describe above is referred to as a "second assembly". The first recess 191 is recessed from the second assembly toward the first assembly. The first protrusion 192 protrudes from the second assembly toward the first assembly and is fitted in the first recess 191. Each of the first recess 191 and the first protrusion 192 may be singular or plural and arranged in the circumferential direction Dr.

For example, in FIG. 4A, the spacer 18 is the first assembly described above, and has the first recess 191. The first recess 191 is disposed on the end portion on the other axial direction D2 side of the spacer 18 and is recessed in the one axial direction D1. The yoke 15 is the second assembly described above and has the first protrusion 192. The first protrusion 192 is disposed on the end portion on the one axial direction D1 side of the yoke 15 and protrudes in the one axial direction D1.

In FIG. 4B, the yoke 15 is the first assembly described above and has the first recess 191. The first recess 191 is disposed on the end portion on the one axial direction D1 side of the yoke 15 and is recessed in the other axial direction D2. In addition, the spacer 18 is the second assembly described above and has the first protrusion 192. The first protrusion 192 is disposed on the end portion on the other axial direction D2 side of the spacer 18 and protrudes in the other axial direction D2.

As described above, since the first protrusion 192 is fitted into the first recess 191 at the contact portion between the end portion on the one axial direction D1 side of the yoke 15 and the end portion on the other axial direction D2 side of the spacer 18, positioning of the spacer 18 in the circumferential direction Dr is easily performed.

It is to be noted that the above-described example does not exclude a configuration in which a fitting structure of the first recess 191 and the first protrusion 192 is not disposed at the contact portion with the yoke 15 and the spacer 18. For example, each of the end portion on the one axial direction D1 side of the yoke 15 and the end portion on the other axial direction D2 side of the spacer 18 may be flat.

In addition, the above-described example does not exclude a configuration in which the end portion on the other axial direction D2 side of the spacer 18 does not come into contact with the end portion on the one axial direction D1 side of the yoke 15.

The present disclosure is not limited to the example of the present example embodiment, and the end portion on the other axial direction D2 side of the spacer 18 may be in contact with the end portion on the one axial direction D1 side of the first magnet 16. Even in this case, the axial position of the spacer 18 is easily determined when the rotor 1 is assembled.

Figure 5A:
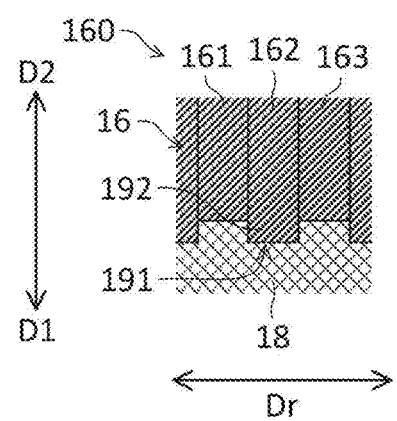
FIG. 5A is a view illustrating a configuration example of an end portion on the one axial direction side of a first magnet and the end portion on another axial direction side of the spacer.
Figure 5B:
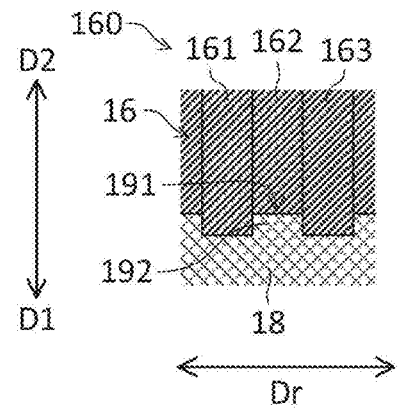
FIG. 5B is a view illustrating another configuration example of the end portion on the one axial direction side of the first magnet and the end portion on another axial direction side of the spacer.

FIGS. 5A and 5B are enlarged views of a contact portion between the first magnet 16 and the spacer 18 as viewed from the radial direction. FIG. 5A is the view illustrating a configuration example of the end portion on the one axial direction D1 side of the first magnet 16 and the end portion on the other axial direction D2 side of the spacer 18. FIG. 5B is the view illustrating another configuration example of the end portion on the one axial direction D1 side of the first magnet 16 and the end portion on the other axial direction D2 side of the spacer 18.

In FIGS. 5A and 5B, one member of the first magnet 16 and the spacer 18 preferably has the first recess 191. The other member of the first magnet 16 and the spacer 18 has the first protrusion 192. In the configurations illustrated in FIGS. 5A and 5B, the one member described above is referred to as the "first assembly", and the other member describe above is referred to as the "second assembly". The first recess 191 is recessed from the second assembly toward the first assembly. The first protrusion 192 protrudes from the second assembly toward the first assembly and is fitted in the first recess 191. Each of the first recess 191 and the first protrusion 192 may be singular or plural and arranged in the circumferential direction Dr.

For example, in FIG. 5A, the spacer 18 is the first assembly described above, and has the first recess 191. The first recess 191 is disposed on the end portion on the other axial direction D2 side of the spacer 18 and is recessed in the one axial direction D1. In addition, the first magnet 16 is the second assembly described above and has the first protrusion 192. The first protrusion 192 is disposed on the end portion on the one axial direction D1 side of the first magnet 16 and protrudes in the one axial direction D1.

In FIG. 5B, the first magnet 16 is the first assembly described above and has the first recess 191. The first recess 191 is disposed on the end portion on the one axial direction D1 side of the first magnet 16 and is recessed in the other axial direction D2. In addition, the spacer 18 is the second assembly described above and has the first protrusion 192. The first protrusion 192 is disposed on the end portion on the other axial direction D2 side of the spacer 18 and protrudes in the other axial direction D2.

As described above, since the first protrusion 192 is fitted into the first recess 191 at the contact portion between the end portion on the one axial direction D1 side of the first magnet 16 and the end portion on the other axial direction D2 side of the spacer 18, the positioning of the spacer 18 in the circumferential direction Dr is easily performed.

In the present example embodiment, as described above, the first magnet 16 has the plurality of magnet pieces 160 arranged in the circumferential direction Dr. Consequently, the first recess 191 or the first protrusion 192 arranged at the end portion on the one axial direction D1 side of the first magnet 16 may be formed by arrangement in the axial direction of the end portion on the one axial direction D1 side of each of the magnet pieces 160.

For example, the first magnet 16 has a first magnet piece 161 to a third magnet piece 163 arranged in order in the circumferential direction Dr. The plurality of magnet pieces 160 include the first magnet piece 161 to the third magnet piece 163. An end portion on the one axial direction D1 side of the second magnet piece 162 is located at the above-described first assembly side in the axial direction with respect to an end portion on the one axial direction D1 side of the first magnet piece 161 and an end portion on the one axial direction D1 side of the third magnet piece 163. For example, when the first magnet 16 has the first protrusion 192 as illustrated in FIG. 5A, the end portion on the one axial direction D1 side of the second magnet piece 162 is located at the one axial direction D1 with respect to the end portions on the one axial direction D1 side of the first magnet piece 161 and the third magnet piece 163. For example, when the first magnet 16 has the first recess 191 as illustrated in FIG. 5B, the end portion on the one axial direction D1 side of the second magnet piece 162 is located at the other axial direction D2 with respect to the end portions on the one axial direction D1 side of the first magnet piece 161 and the third magnet piece 163. That is, the first recess 191 or the first protrusion 192 is formed by the arrangement of each of the end portions on the one axial direction D1 side of the first magnet piece 161 to the third magnet piece 163. Consequently, for example, the first recess 191 or the first protrusion 192 is easily formed as compared with a configuration in which the first recess 191 or the first protrusion 192 is formed in the single first magnet 16.

It is to be noted that the above-described example does not exclude a configuration in which the first recess 191 or the first protrusion 192 arranged in the first magnet 16 is not dependent on the arrangement in the axial direction of the end portions on the one axial direction D1 side of the plurality of magnet pieces 160 arranged in the circumferential direction Dr. For example, the first recess 191 or the first protrusion 192 may be disposed on the end portion on the one axial direction D1 side of the first magnet 16 that is the single member.

It is to be noted that the above-described example does not exclude a configuration in which a fitting structure of the first recess 191 and the first protrusion 192 is not disposed at the contact portion with the first magnet 16 and the spacer 18. For example, each of the end portion on the one axial direction D1 side of the first magnet 16 and the end portion on the other axial direction D2 side of the spacer 18 may be flat.

In addition, the above-described example does not exclude a configuration in which the end portion on the other axial direction D2 side of the spacer 18 does not come into contact with the end portion on the one axial direction D1 side of the first magnet 16.

Then, an end portion on the one axial direction D1 side of the spacer 18 is in contact with an end portion on the other axial direction D2 side of the second magnet 17. As a result, when assembling the rotor 1, an axial position of the second magnet 17 is easily determined.

Figure 6A:
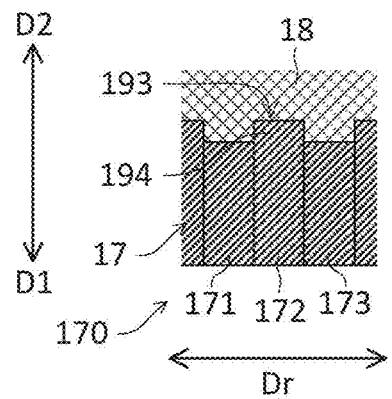
FIG. 6A is a view illustrating a configuration example of an end portion on the other axial direction side of a second magnet and an end portion on the one axial direction side of the spacer.
Figure 6B:
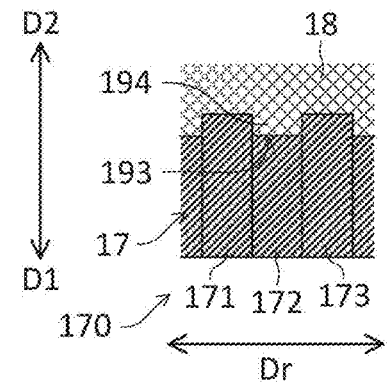
FIG. 6B is a view illustrating another configuration example of the end portion on the other axial direction side of the second magnet and the end portion on the one axial direction side of the spacer.

FIGS. 6A and 6B are enlarged views of a contact portion between the second magnet 17 and the spacer 18 as viewed from the radial direction. FIG. 6A is the view illustrating a configuration example of the end portion on the other axial direction D2 side of the second magnet 17 and the end portion on the one axial direction D1 side of the spacer 18. FIG. 6B is the view illustrating another configuration example of the end portion on the other axial direction D2 side of the second magnet 17 and the end portion on the one axial direction D1 side of the spacer 18.

In FIGS. 6A and 6B, one member of the second magnet 17 and the spacer 18 preferably has a second recess 193. In the configurations illustrated in FIGS. 6A and 6B, the one member described above is referred to as a "third assembly". The other member of the second magnet 17 and the spacer 18 has a second protrusion 194. In the configurations illustrated in FIGS. 6A and 6B, the other member described above is referred to as a "fourth assembly". The second recess 193 is recessed from the fourth assembly toward the third assembly. The second protrusion 194 protrudes from the fourth assembly toward the third assembly and is fitted into the second recess 193. Each of the second recess 193 and the second protrusion 194 may be singular or plural and arranged in the circumferential direction Dr.

For example, in FIG. 6A, the spacer 18 is the third assembly described above, and has the second recess 193. The second recess 193 is disposed on the end portion on the one axial direction D1 side of the spacer 18 and is recessed in the other axial direction D2. The second magnet 17 is the fourth assembly described above and has the second protrusion 194. The second protrusion 194 is disposed on the end portion on the other axial direction D2 side of the second magnet 17 and protrudes in the other axial direction D2.

In FIG. 6B, the second magnet 17 is the third assembly described above and has the second recess 193. The second recess 193 is disposed on the end portion on the other axial direction D2 side of the second magnet 17 and is recessed in the one axial direction D1. The spacer 18 is the fourth assembly described above and has the second protrusion 194. The second protrusion 194 is disposed on the end portion on the one axial direction D1 side of the spacer 18 and protrudes in the one axial direction D1.

As described above, since the second protrusion 194 is fitted into the second recess 193 at the contact portion between the end portion on the other axial direction D2 side of the second magnet 17 and the end portion on the one axial direction D1 side of the spacer 18, positioning of the second magnet 17 in the circumferential direction Dr is easily performed.

In the present example embodiment, as described above, the second magnet 17 has the plurality of magnet pieces 170 arranged in the circumferential direction Dr. Consequently, the second recess 193 or the second protrusion 194 arranged at the end portion on the other axial direction D2 side of the second magnet 17 may be formed by arrangement in the axial direction of the end portion on the other axial direction D2 side of each of the magnet pieces 170.

For example, the second magnet 17 has a fourth magnet piece 171 to a sixth magnet piece 173 arranged in order in the circumferential direction Dr. The plurality of magnet pieces 170 include the fourth magnet piece 171 to the sixth magnet piece 173. An end portion on the other axial direction D2 side of the fifth magnet piece 172 is located at the above-described third assembly side in the axial direction with respect to an end portion on the other axial direction D2 side of the fourth magnet piece 171 and an end portion on the other axial direction D2 side of the sixth magnet piece 173. For example, when the second magnet 17 has the second protrusion 194 as illustrated in FIG. 6A, the above-described third assembly having the second recess 193 is the spacer 18. In this case, the end portion on the other axial direction D2 side of the fifth magnet piece 172 is located at the other axial direction D2 with respect to the end portions on the other axial direction D2 side of the fourth magnet piece 171 and the sixth magnet piece 173. When the second magnet 17 has the second recess 193 as illustrated in FIG. 6B, the above-described third assembly having the second recess 193 is the second magnet 17. In this case, the end portion on the other axial direction D2 side of the fifth magnet piece 172 is located at the one axial direction D1 with respect to the end portions on the other axial direction D2 side of the fourth magnet piece 171 and the sixth magnet piece 173. That is, the second recess 193 or the second protrusion 194 is formed by the arrangement of each of the end portions on the other axial direction D2 side of the fourth magnet piece 171 to the sixth magnet piece 173. Consequently, the second recess 193 or the second protrusion 194 is easily formed as compared with a configuration in which the second recess 193 or the second protrusion 194 is formed, for example, in the single second magnet 17.

Axial positions of end portions on the one axial direction D1 side of the plurality of magnet pieces 170 are preferably the same. For example, the axial positions of the end portions on the one axial direction D1 side of the fourth magnet piece 171 to the sixth magnet piece 173 are the same. In this case, in the second magnet 17, magnetic poles different from each other (the N pole, the S pole) are preferably arranged in the axial direction. The magnetic sensor 5 is disposed on the one axial direction D1 with respect to the second magnet 17. At least a part of the magnetic sensor 5 is further preferably superimposed on the second magnet 17 in the axial direction. Since the axial positions of the end portions on the one axial direction D1 side of the fourth magnet piece 171 to the sixth magnet piece 173 are made to be the same, magnetic flux densities of the fourth magnet piece 171 to the sixth magnet piece 173 passing through the magnetic sensor 5 become stronger. Consequently, the detection accuracy of the magnetic sensor 5 is improved. However, the above example does not exclude a configuration in which the axial positions of the end portions on the one axial direction D1 side of at least one part of the plurality of magnet pieces 170 are different from the axial positions of the end portions on the one axial direction D1 side of another part.

It is to be noted that the above-described example does not exclude a configuration in which the second recess 193 or the second protrusion 194 arranged in the second magnet 17 is not dependent on the arrangement in the axial direction of the end portions on the other axial direction D2 side of the plurality of magnet pieces 170 arranged in the circumferential direction Dr. For example, the second recess 193 or the second protrusion 194 may be disposed on the end portion on the other axial direction D2 side of the second magnet 17 that is the single member.

Further, the present disclosure is not limited to the above-described example, and the fitting structure of the second recess 193 and the second protrusion 194 may not be disposed at the contact portion with the second magnet 17 and the spacer 18. For example, each of the end portion on the other axial direction D2 side of the second magnet 17 and the end portion on the one axial direction D1 side of the spacer 18 may be flat.

In addition, the above-described example does not exclude a configuration in which the end portion on the one axial direction D1 side of the spacer 18 does not come into contact with the end portion on the other axial direction D2 side of the second magnet 17.

The stator 2 rotationally drives the rotor 1 in accordance with supply of electric power. The stator 2 has the annual stator core 21. The stator core 21 surrounds the central axis CA extending in the axial direction. The stator core 21 is a magnetic material, and is a laminated body in which electromagnetic steel plates are laminated in the axial direction in the present example embodiment. The stator 2 further has coil portions 22. Each of the coil portions 22 is a member in which a coil-shaped conducting wire is disposed on the stator core 21. When a driving current is supplied to each of the coil portions 22, the stator 2 is excited and drives the rotor 1. The conducting wire is, for example, an enamel-coated copper wire, a metal wire coated with an insulating member, or the like, and is wound around a tooth (not illustrated) of the stator core 21 via an insulator (not illustrated) to form the coil portion 22.

The stator holder 3 holds the stator 2. As described above, the motor 100 includes the stator holder 3. The stator holder 3 has a holder tube portion 31 and a base portion 32. The holder tube portion 31 has a tube shape surrounding the central axis CA and extends in the axial direction. The stator core 21 is fixed to a radially outer side surface of the holder tube portion 31. Bearings 311 are disposed inside the holder tube portion 31, and the shaft 10 is inserted through the bearings 311. The holder tube portion 31 rotatably supports the shaft 10 via the bearings 311. The base portion 32 is disposed on the one axial direction D1 with respect to the rotor 1 and the stator 2, and expands radially outward from an end portion on the one axial direction D1 side of the holder tube portion 31. A radially outside portion of the base portion 32 faces the flange portion 13 and the circumferential wall portion 14 of the rotor 1 in the axial direction.

Various electronic components such as a driving device of the stator 2 are mounted on the substrate 4. The substrate 4 expands radially outward and extends in the circumferential direction Dr. The substrate 4 is disposed on an end surface on the other axial direction D2 side of the base portion 32.

The magnetic sensor 5 detects the magnetic force of the second magnet 17. As described above, the motor 100 includes the magnetic sensor 5. The motor 100 detects a rotation angle of the rotor 1 and so on based on a detection result of the magnetic sensor 5. The magnetic sensor 5 is a Hall element in the present example embodiment. In FIGS. 1 and 2, the magnetic sensor 5 is disposed on the one axial direction D1 with respect to the second magnet 17, and is mounted on the substrate 4. At least a part of the magnetic sensor 5 is superimposed on the second magnet 17 in the axial direction. The magnetic sensor 5 may be singular or plural and arranged in the circumferential direction Dr.

It is to be noted that the arrangement of the magnetic sensor 5 is not limited to the examples in FIGS. 1 and 2. For example, the magnetic sensor 5 may be disposed on the stator holder 3. As an example, as illustrated in FIG. 3, the magnetic sensor 5 may be disposed on the radially outer side surface of the holder tube portion 31. The magnetic sensor 5 preferably faces the second magnet 17 in the radial direction. For example, at least a part of the magnetic sensor 5 is superimposed on the second magnet 17 in the radial direction. In this case, in the second magnet 17, magnetic poles different from each other (the N pole, the S pole) are preferably arranged in the radial direction. That is, the second magnet 17 is magnetized in the radial direction. In this way, the magnetic sensor 5 is disposed in a vacant space in the one axial direction D1 side with respect to the stator 2. Consequently, since it is not necessary to secure a space for disposing the magnetic sensor 5 in the one axial direction D1 side with respect to the second magnet 17, there is a contribution to miniaturization of the motor 100. In particular, the axial size of the motor 100 is reduced as compared with a configuration in which the magnetic sensor 5 faces the second magnet 17 in the axial direction.

The encoder 6 detects the rotation angle of the rotor 1. The encoder 6 is mounted on the substrate 4 and is disposed radially outward with respect to the magnetic sensor 5. The encoder 6 faces the flange portion 13 of the rotor 1 in the axial direction.

A second example embodiment will be described hereinafter. Configurations of the second example embodiment different from those of the first example embodiment and the modifications of the first example embodiment described above will be described. Constituent elements similar to those in the first example embodiment and the modification of the first example embodiment described above are denoted by the same reference numerals, and descriptions of the similar constituent elements may be omitted.

Figure 7:
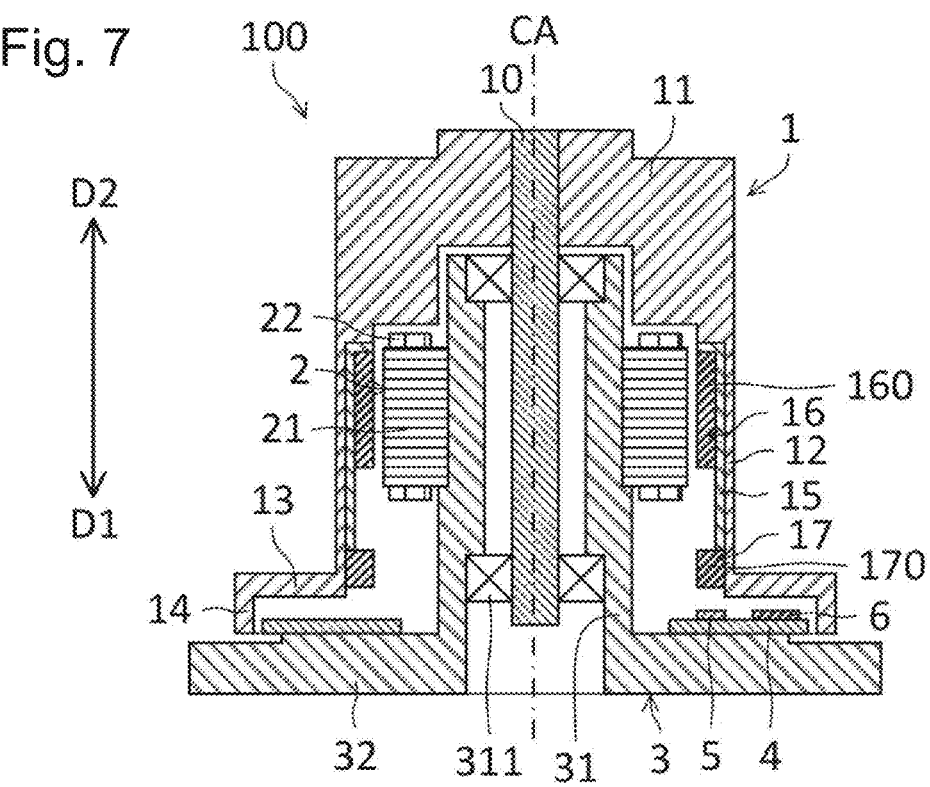
FIG. 7 is a sectional view illustrating a configuration example of the motor according to a second example embodiment of the present disclosure.

FIG. 7 is a sectional view illustrating a configuration example of the motor 100 according to the second example embodiment. As illustrated in FIG. 7, the second magnet 17 is disposed on the end portion (for example, the radially inner end portion) on the stator core 21 side in the radial direction of the rotor tube portion 12. As a result, the radial size of the second magnet 17 is further increased as compared with a configuration in which the second magnet 17 is disposed on the rotor tube portion 12 via a member such as the yoke 15. Consequently, a magnetic force of the second magnet 17 is made to be stronger, and detection accuracy of the magnetic sensor 5 is improved. Alternatively, the axial size of the second magnet 17 is further reduced, while the reduction in the magnetic force being suppressed or prevented.

In addition, in the second example embodiment, as illustrated in FIG. 7, the spacer 18 is not disposed in the rotor 1. Instead, the end portion on the one axial direction D1 side of the yoke 15 extends in the one axial direction D1 with respect to the end portion on the one axial direction D1 side of the first magnet 16 and is in contact with an end surface on the other axial direction D2 side of the second magnet 17. In this way, positioning of the second magnet 17 with respect to first magnet 16 in the axial direction is performed without disposing the spacer 18. Since the spacer 18 is omitted, the weight of the motor 100 is further reduced. In addition, since the number of the components of the motor 100 is decreased, the number of the manufacturing processes and the manufacturing cost of the motor 100 is reduced. Consequently, productivity of the motor 100 is improved.

Figure 8A:
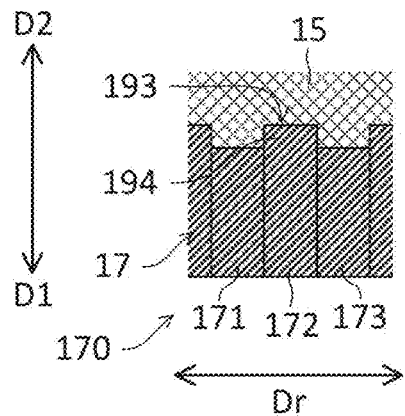
FIG. 8A is a view illustrating a configuration example of the end portion on the one axial direction side of the yoke and the end portion on another axial direction side of the second magnet.
Figure 8B:
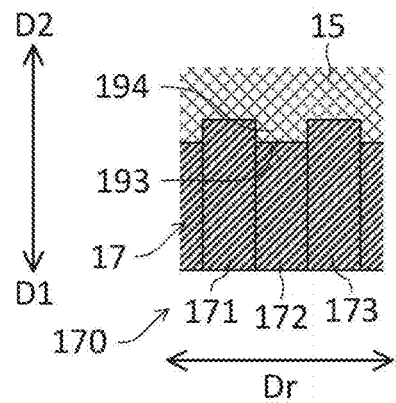
FIG. 8B is a view illustrating another configuration example of the end portion on the one axial direction side of the yoke and the end portion on another axial direction side of the second magnet.

FIGS. 8A and 8B are enlarged views of a contact portion between the yoke 15 and the second magnet 17 as viewed from the radial direction. FIG. 8A is the view illustrating a configuration example of the end portion on the one axial direction D1 side of the yoke 15 and the end portion on the other axial direction D2 side of the second magnet 17. FIG. 8B is the view illustrating another configuration example of the end portion on the one axial direction D1 side of the yoke 15 and the end portion on the other axial direction D2 side of the second magnet 17.

In FIGS. 8A and 8B, one member of the yoke 15 and the second magnet 17 preferably has the second recess 193. The other member of the yoke 15 and the second magnet 17 has the second protrusion 194. In the configuration illustrated in FIGS. 8A and 8B, the one member described above is referred to as the "third assembly", and the other member described above is referred to as the "fourth assembly". The second recess 193 is recessed from the fourth assembly toward the third assembly. The second protrusion 194 protrudes from the fourth assembly toward the third assembly and is fitted into the second recess 193. Each of the second recess 193 and the second protrusion 194 may be singular or plural and arranged in the circumferential direction Dr.

The contact portion between the yoke 15 and the second magnet 17 is configured similarly to the contact portion between the second magnet 17 and the spacer 18 in the first example embodiment.

For example, FIG. 8A is configured similarly to FIG. 6A of the first example embodiment. In detail, the yoke 15 is the third assembly described above and has the second recess 193. The second recess 193 is disposed on the end portion on the one axial direction D1 side of the yoke 15 and is recessed in the other axial direction D2. The second magnet 17 is the fourth assembly described above and has the second protrusion 194. The second protrusion 194 is disposed on the end portion on the other axial direction D2 side of the second magnet 17 and protrudes in the other axial direction D2.

FIG. 8B is configured similarly to FIG. 6B of the first example embodiment. In detail, the second magnet 17 is the third assembly described above and has the second recess 193. The second recess 193 is disposed on the end portion on the other axial direction D2 side of the second magnet 17 and is recessed in the one axial direction D1. The yoke 15 is the fourth assembly described above and has the second protrusion 194. The second protrusion 194 is disposed on the end portion on the one axial direction D1 side of the yoke 15 and protrudes in the one axial direction D1.

As described above, since the second protrusion 194 is fitted into the second recess 193 at the contact portion between the end portion on the one axial direction D1 side of the yoke 15 and the end portion on the other axial direction D2 side of the second magnet 17, the positioning of the second magnet 17 with respect to the yoke 15 in the circumferential direction Dr is easily performed.

As described above, the second magnet 17 has the plurality of magnet pieces 170 arranged in the circumferential direction Dr. Consequently, the second recess 193 or the second protrusion 194 arranged at the end portion on the other axial direction D2 side of the second magnet 17 may be formed by arrangement in the axial direction of the end portion on the other axial direction D2 side of each of the magnet pieces 170.

It is to be noted that the above-described example does not exclude the configuration in which the second recess 193 or the second protrusion 194 arranged in the second magnet 17 is not dependent on the arrangement in the axial direction of the end portions on the other axial direction D2 side of the plurality of magnet pieces 170 arranged in the circumferential direction Dr. For example, the second recess 193 or the second protrusion 194 may be disposed on the end portion on the other axial direction D2 side of the second magnet 17 that is the single member.

Further, the present disclosure is not limited to the above-described example, and the fitting structure of the second recess 193 and the second protrusion 194 may not be disposed at the contact portion with the yoke 15 and the second magnet 17. For example, each of the end portion on the one axial direction D1 side of the yoke 15 and the end portion on the other axial direction D2 side of the second magnet 17 may be flat.

In addition, the above-described example does not exclude a configuration in which the end portion on the other axial direction D2 side of the second magnet 17 does not come into contact with the end portion on the one axial direction D1 side of the yoke 15.

The example embodiments of the present disclosure have been described above. It is to be noted that the scope of the present disclosure is not limited to the above-described example embodiments. The present disclosure is implemented by adding various modifications to the above-described example embodiments within a range not departing from the spirit of the disclosure. In addition, the matters described in the above-described example embodiments are arbitrarily combined together as appropriate within a range where no inconsistency occurs.

The present disclosure is useful for a device in which a magnet used in a pair with a magnetic sensor is disposed separately from a magnet for driving a rotor.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
   a stator including an annular stator core surrounding a central axis extending in an axial direction;
   a rotor rotatable about the central axis; and
   a magnetic sensor; wherein
   the rotor includes:
      a first magnet outward in a radial direction with respect to the stator core;
      a yoke on an end portion opposite to the stator core in the radial direction of the first magnet;
      a second magnet extending in one axial direction with respect to the first magnet and the stator core; and
      a spacer between the first magnet and the second magnet in the axial direction;
   the magnetic sensor detects a magnetic force of the second magnet;
   the spacer is made of a non-magnetic material;
   an end portion on another axial direction side of the spacer is in contact with an end portion on the one axial direction side of the yoke;
   a first assembly that is one of the yoke and the spacer includes a first recess;
   a second assembly that is another one of the yoke and the spacer includes a first protrusion;
   the first recess is recessed from the second assembly toward the first assembly; and
   the first protrusion protrudes from the second assembly toward the first assembly and is fitted in the first recess.

2. The motor according to claim 1, wherein
   the rotor further includes a rotor tube portion that extends in the axial direction and surrounds the central axis;
   the second magnet is on an end portion on a the-stator core side in the radial direction of the rotor tube portion; and
   the spacer includes a portion of the rotor tube portion.

3. The motor according to claim 1, wherein an end portion on a stator core side in the radial direction of the spacer is at one of a radial position same as an end portion on the stator core side in the radial direction of the first magnet and a position on an opposite side to the stator core in the radial direction with respect to the end portion on the stator core side in the radial direction of the first magnet.

4. A motor comprising:
   a stator including an annular stator core surrounding a central axis extending in an axial direction;
   a rotor rotatable about the central axis; and
   a magnetic sensor; wherein
   the rotor includes:
      a first magnet outward in a radial direction with respect to the stator core;
      a yoke on an end portion opposite to the stator core in the radial direction of the first magnet; and
      a second magnet extending in one axial direction with respect to the first magnet and the stator core;
   the magnetic sensor detects a magnetic force of the second magnet;
   the second magnet is spaced by a gap from the first magnet in the axial direction; and
   one axial direction end portion of the yoke extends in the one axial direction with respect to one axial direction end portion of the first magnet and is in contact with the other axial direction end surface of the second magnet.

5. The motor according to claim 4, wherein
the rotor further includes a rotor tube portion that extends in the axial direction and surrounds the central axis; and
the second magnet is on an end portion on a the-stator core side in the radial direction of the rotor tube portion.

6. The motor according to claim 4, wherein
a third assembly that is one of the yoke and the second magnet includes a second recess;
a fourth assembly that is another one of the yoke and the second magnet includes a second protrusion;
the second recess is recessed from the fourth assembly toward the third assembly; and
the second protrusion protrudes from the fourth assembly toward the third assembly and is fitted in the second recess.

7. A motor comprising:
a stator including an annular stator core surrounding a central axis extending in an axial direction;
a rotor rotatable about the central axis; and
a magnetic sensor; wherein
the rotor includes:
  a first magnet outward in a radial direction with respect to the stator core;
  a yoke on an end portion opposite to the stator core in the radial direction of the first magnet;
  a second magnet extending in one axial direction with respect to the first magnet and the stator core; and
  a spacer between the first magnet and the second magnet in the axial direction;
the magnetic sensor detects a magnetic force of the second magnet;
the spacer is made of a non-magnetic material;
an end portion on another axial direction side of the spacer is in contact with an end portion on the one axial direction side of the first magnet;
a first assembly that is one of the first magnet and the spacer includes a first recess;
a second assembly that is another one of the first magnet and the spacer includes a first protrusion;
the first recess is recessed from the second assembly toward the first assembly; and
the first protrusion protrudes from the second assembly toward the first assembly and is fitted in the first recess.

8. The motor according to claim 7, wherein
the first magnet includes a first magnet piece, a second magnet piece, and a third magnet piece arranged in order in a circumferential direction; and
an end portion on the one axial direction side of the second magnet piece is located at the first assembly side in the axial direction with respect to an end portion on the one axial direction side of the first magnet piece and an end portion on the one axial direction side of the third magnet piece.

9. The motor according to claim 7, wherein
the rotor further includes a rotor tube portion that extends in the axial direction and surrounds the central axis;
the second magnet is on an end portion on a stator core side in the radial direction of the rotor tube portion; and
the spacer includes a portion of the rotor tube portion.

10. The motor according to claim 7, wherein an end portion on a stator core side in the radial direction of the spacer is at one of a radial position same as an end portion on the stator core side in the radial direction of the first magnet and a position on an opposite side to the stator core in the radial direction with respect to the end portion on the stator core side in the radial direction of the first magnet.

11. A motor comprising:
a stator including an annular stator core surrounding a central axis extending in an axial direction;
a rotor rotatable about the central axis; and
a magnetic sensor, wherein
the rotor includes:
  a first magnet outward in a radial direction with respect to the stator core;
  a yoke on an end portion opposite to the stator core in the radial direction of the first magnet:
  a second magnet extending in one axial direction with respect to the first magnet and the stator core; and
  a spacer between the first magnet and the second magnet in the axial direction;
the magnetic sensor detects a magnetic force of the second magnet;
the spacer is made of a non-magnetic material;
a third assembly that is one of the second magnet and the spacer includes a second recess;
a fourth assembly that is the other of the second magnet and the spacer includes a second protrusion;
the second recess is recessed from the fourth assembly toward the third assembly; and
the second protrusion protrudes from the fourth assembly toward the third assembly and is fitted in the second recess.

12. The motor according to claim 11, wherein
the second magnet includes a fourth magnet piece, a fifth magnet piece, and a sixth magnet piece arranged in order in a circumferential direction; and
an end portion on another axial direction side of the fifth magnet piece is located at the third assembly side in the axial direction with respect to an end portion on the other axial direction side of the fourth magnet piece and an end portion on the other axial direction side of the sixth magnet piece.

13. The motor according to claim 12, wherein
positions in the axial direction of end portions on the one axial direction side from the fourth magnet piece to the sixth magnet piece are the same;
different magnetic poles are arranged in the axial direction in the second magnet;
the magnetic sensor is on the one axial direction with respect to the second magnet; and
at least a portion of the magnetic sensor is superimposed on the second magnet in the axial direction.

14. The motor according to claim 11, further comprising:
a stator holder holding the stator; wherein
different magnetic poles are arranged in the radial direction in the second magnet;
the magnetic sensor is on the stator holder; and
at least a portion of the magnetic sensor is superimposed on the second magnet in the radial direction.

15. The motor according to claim 11, wherein
the rotor further includes a rotor tube portion that extends in the axial direction and surrounds the central axis;
the second magnet is on an end portion on a stator core side in the radial direction of the rotor tube portion; and
the spacer includes a portion of the rotor tube portion.

16. The motor according to claim 11, wherein an end portion on a stator core side in the radial direction of the spacer is at one of a radial position same as an end portion on the stator core side in the radial direction of the first magnet and a position on an opposite side to the stator core in the radial direction with respect to the end portion on the stator core side in the radial direction of the first magnet.

\* \* \* \* \*